April 27, 1954

H. D. SOEDER 2,676,337

CHILD'S VEHICLE BED

Filed April 4, 1952

INVENTOR.
Harlan D. Soeder
BY
Burm, Doane & Benedict
ATTORNEYS

Patented Apr. 27, 1954

2,676,337

UNITED STATES PATENT OFFICE 2,676,337

CHILD'S VEHICLE BED

Harlan D. Soeder, Lakeland, Fla.

Application April 4, 1952, Serial No. 280,540

3 Claims. (Cl. 5—94)

The present invention relates to a bed for infants or children for use while traveling in vehicles such as automobiles, trains, buses, airplanes, and the like.

One of the primary objects of the invention is to provide a comfortable, safe and sanitary bed which can be used by infants and children during vehicular travel. Another object of the invention is to provide an infant's vehicle bed having a generally flat, horizontal upper body supporting surface and a lower surface which slopes to follow the contour of a vehicle seat cushion. Still another object of the invention is to provide means for securing the bed on the vehicle seat in order to prevent accidental displacement thereof. Still another object of the invention is to provide means for preventing both accidental and intentional movement or falling of the infant from the bed. Another object of the invention is to provide an infant's vehicle bed which is light in weight, which is easily stored and which can be kept in clean and sanitary condition.

Figure 1:
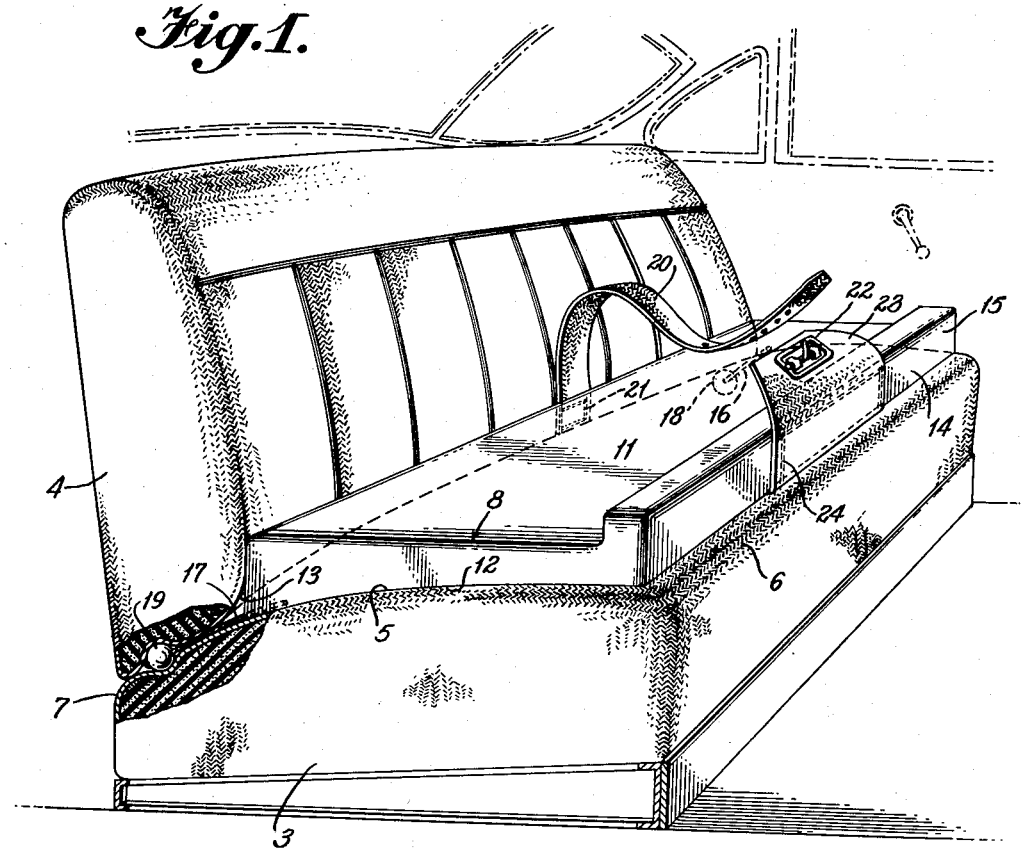
Figure 2:
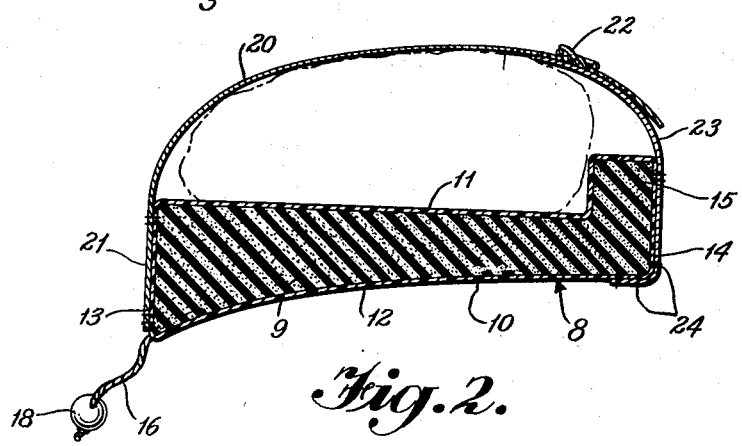

A complete understanding of the invention can be had from the following description taken in connection with the accompanying drawing, wherein:

Figure 1 is a perspective view of a bed embodying my invention, showing the bed mounted on a seat of a vehicle such as an automobile, and Figure 2 is a transverse sectional view of the bed shown in Figure 1.

Figure 1 illustrates a conventional vehicle seat having an upholstered seat cushion 3 and an upholstered back rest 4. The upper surface 5 of the seat cushion slopes from its forward edge 6 to its rearward edge 7 in a manner typical of modern vehicles. The bed is designated generally by the reference numeral 8. It consists of a mattress 9 having a suitable covering 10 which is preferably of moisture-proof material. The upper body supporting surface 11 of the mattress lies in a generally flat plane. The lower seat cushion engaging surface 12 of the mattress decreases in thickness from its rearward longitudinal edge 13 to its forward longitudinal edge 14, in such manner as to conform generally to the slope of the upper surface 5 of the seat cushions 3. In this manner the upper body supporting surface 11 of the mattress 8 lies in a substantially horizontal plane when the mattress rests on the seat cushion in the manner illustrated in Figure 1.

The mattress is formed to provide an upstanding curb 15 along its forward longitudinal edge for the purpose of assisting in preventing a child or infant from rolling over the forward edge of the mattress during deceleration of the vehicle.

The mattress is provided at each end of its rearward longitudinal edge 13 with cords 16 and 17 to which are attached round balls 18 and 19. The balls 18 and 19 may be pressed into the crevice between the upholstered seat cushion 3 and the upholstered back rest 4. The balls are thus removably held in their positions within the crevice and the cords 16 and 17 prevent unintentional forward movement of the mattress 8 relative to the seat cushion 3. The cords 16 and 17 also serve to secure the mattress in a position such that its rearward longitudinal edge 13 lies against or adjacent the upholstered back rest 4. The back rest 4 thus forms a curb along the rearward edge of the mattress which cooperates with the curb 15 to restrain an infant against rolling movement during acceleration or deceleration of the vehicle.

There is also provided a web 20 which is stitched or otherwise secured to the mattress cover 10 along the rearward edge of the mattress as indicated by the reference numeral 21. The free end of the web 20 is arranged to be secured by any suitable means such as a buckle 22 to a flap 23 which is stitched or otherwise secured to the mattress cover 10 along the forward edge of the mattress as indicated by the reference numeral 24. The web 20 on the flap 23 may be of any suitable width and more than one web or flap may be utilized if desired. The web 20, when secured to the flap 23, will restrain the infant or child against excessive movement on the upper surface 11 of the mattress and will also be of assistance in preventing the child from becoming uncovered.

The length of the mattress 8 is shown as being substantially equal to the length of the vehicle seat on which it is to be used. In this case the upholstered back rest 4, the curb 15, and the sides of the vehicle cooperate to form four walls around the sides and ends of the bed. However, the mattress 8 may be of any other appropriate length to accommodate the child or infant and to rest on seats of other types and sizes.

The mattress is illustrated in the drawing as being formed of sponge rubber or cellular rubber, and this is the preferred material. However, the mattress may be formed of any other conventional mattress or upholstery filling material.

Having thus described my invention, I claim:

1. A child's vehicle bed for positioning longitudinally on a rearwardly sloping seat cushion of a vehicle with the rearward longitudinal edge of the bed adjacent the back rest of the vehicle, said bed comprising a mattress having an upper body supporting surface lying generally in a flat plane and a lower vehicle seat cushion engaging surface of a configuration to conform to the rearwardly sloping seat cushion of the vehicle, said mattress gradually decreasing in thickness from its rearward longitudinal edge toward its forward longitudinal edge to enable said upper body supporting surface to be substantially horizontal when substantially the entire area of said lower seat cushion engaging surface contacts and rests on the rearwardly sloping seat cushion of a vehicle, and an upstanding curb along the forward longitudinal edge of said mattress, said curb extending abruptly upwardly from the flat upper surface of said mattress.

2. A child's vehicle bed as defined in claim 1 which includes means for securing said mattress on the vehicle seat with the rearward longitudinal edge of the mattress adjacent the back rest of the vehicle.

3. A child's vehicle bed as defined in claim 1 which includes restraining means extending over said body supporting surface from the rearward to the forward longitudinal edges of said mattress to restrain a child in position on said body supporting surface.

References Cited in the file of this patent

UNITED STATES PATENTS

| Number | Name | Date |
|---|---|---|
| 1,959,974 | Westgate | May 22, 1934 |
| 2,555,659 | Rose | June 5, 1951 |

OTHER REFERENCES

Popular Mechanics, article by Willis, page 174, January 1949.